United States Patent
Ul-haq et al.

(10) Patent No.: US 11,421,326 B2
(45) Date of Patent: Aug. 23, 2022

(54) HYPERBRANCHED POLYMERS WITH ACTIVE GROUPS AS EFFICIENT CORROSION INHIBITORS

(71) Applicant: Saudi Arabian Oil Company, Dhahran (SA)

(72) Inventors: Muhammad Imran Ul-haq, Dhahran (SA); Abdullah Al-Malki, Dammam (SA); Donya A. Alsewdan, Dammam (SA); Nayef M. Alanazi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/907,796

(22) Filed: Jun. 22, 2020

(65) Prior Publication Data

US 2021/0395898 A1    Dec. 23, 2021

(51) Int. Cl.
*C23F 11/173* (2006.01)

(52) U.S. Cl.
CPC ................. *C23F 11/173* (2013.01)

(58) Field of Classification Search
CPC .................................................. C23F 11/173
See application file for complete search history.

(56) References Cited

U.S. PATENT DOCUMENTS

| | | | |
|---|---|---|---|
| 4,820,423 | A | 4/1989 | Crucil et al. |
| 4,898,686 | A | 2/1990 | Johnson et al. |
| 5,939,362 | A | 8/1999 | Johnson et al. |
| 6,646,082 | B2 | 11/2003 | Ghosh et al. |
| 9,487,729 | B2 | 11/2016 | Haque et al. |
| 9,493,598 | B2 | 11/2016 | Musa et al. |
| 2003/0063998 | A1 | 4/2003 | Ghosh et al. |
| 2006/0062753 | A1* | 3/2006 | Naraghi ............. C08G 73/0226 424/78.27 |
| 2018/0244552 | A1 | 8/2018 | Reyes et al. |
| 2019/0211249 | A1 | 7/2019 | Cole et al. |

FOREIGN PATENT DOCUMENTS

| | | |
|---|---|---|
| CA | 1330390 | 6/1994 |
| CN | 105944945 A | 9/2016 |
| DE | 102005046642 A1 | 4/2007 |
| EP | 0333135 A1 | 9/1989 |
| EP | 2449153 B1 | 1/2019 |
| JP | 2014005498 A | 1/2014 |
| WO | 9851902 A1 | 11/1998 |
| WO | 2011128437 A1 | 10/2011 |
| WO | 2014178263 A1 | 11/2014 |

OTHER PUBLICATIONS

Paez, Dendritic polyglycerolamine as a functional antifouling coating of gold surfaces, J. Mater. Chem., 2012, 22, 19488-19497 (Year: 2012).*
International Search Report and Written Opinion dated Oct. 27, 2021 pertaining to PCT/US2021/038199 filed Jun. 21, 2021, 17 pages.
Parzuchowski et al., "Hyperbranched polyglycerols containing amine groups—Synthesis, characterization and carbon dioxide capture", Journal of CO2 Utilization, vol. 27, pp. 145-160, 2018.
Tiu et al., "Polymeric corrosion inhibitors for the oil and gas industry: Design principles and mechanism", Reactive and Functional Polymers, vol. 95, pp. 25-45, 2015.

\* cited by examiner

*Primary Examiner* — Tabatha L Penny
(74) *Attorney, Agent, or Firm* — Dinsmore & Shohl LLP

(57) ABSTRACT

In accordance with one or more embodiments of the present disclosure, a process for preventing corrosion of a metallic surface of a pipeline includes contacting the metallic surface with a corrosion inhibitor. The corrosion inhibitor comprises a polymer of formula R—O—(POL)-Z. R is a straight or branched alkyl or aryl; POL is a polyglycerol based polymer; Z is a non-ionic amine, a cyclic amine having 5 to 8 atoms, a diamine, a triamine, a tetra-amine, a polymeric amine, a thiol, a disulfide, or —NH—$R_1$—SH; and $R_1$ is a hydrocarbyl. The corrosion inhibitor is also disclosed.

13 Claims, 3 Drawing Sheets

HYPERBRANCHED POLYMERS WITH ACTIVE GROUPS AS EFFICIENT CORROSION INHIBITORS

FIELD

Embodiments of the present disclosure generally relate to inhibiting the formation of corrosion, and pertains particularly to a polymer-based corrosion inhibitor for preventing corrosion of a metallic surface of a pipeline.

TECHNICAL BACKGROUND

Corrosion is an electrochemical process that can lead to deterioration of surfaces—commonly metal surfaces—resulting in economic loss and operational issues. Formation of corrosion in oil and gas pipelines can be exceptionally costly and pose serious safety concerns. Such corrosion can damage pipeline, equipment, and operational facilities.

Sources of corrosion of metal surfaces include dissolved gases, such as carbon dioxide ($CO_2$), which causes "sweet corrosion," and hydrogen sulfide ($H_2S$), which causes "sour corrosion." In oil and gas production, high salt concentration in water produced with the oil and gas may also lead to significant corrosion of metal surfaces. Regardless of the cause, the formation of corrosion must be inhibited to avoid low capacity production and discontinuity of operations. Corrosion inhibitors may be used in oil and gas production to mitigate corrosion during production, transportation, and processing.

Conventional corrosion inhibition in oil and gas pipelines requires repeated injection of corrosion inhibitors into the pipeline. Additionally, conventional corrosion inhibitors are small molecules that do not form effective inhibition films and are often not biodegradable or biocompatible. Even polymer-based conventional corrosion inhibitors fail to form effective inhibition films due to their large hydrodynamic radius. Additionally, polymer-based conventional corrosion inhibitors are often prepared through copolymers and terpolymers, requiring control over incorporation of each monomer and a labor-intensive purification protocol.

SUMMARY

There is a continual need for novel corrosion inhibitors that can be used in a wide variety of environments, perform well, be produced economically, remain stable over long periods of time, be minimally toxic or non-toxic, and have minimal adverse impacts on the environment. Embodiments of the present disclosure are directed to polymer-based corrosion inhibitors focused on addressing this need.

According to one embodiment, a process for preventing corrosion of a metallic surface of a pipeline includes contacting the metallic surface with a corrosion inhibitor. The corrosion inhibitor comprises a polymer of formula R—O—(POL)-Z. R is a straight or branched alkyl or aryl; POL is a polyglycerol based polymer; Z is a non-ionic amine, a cyclic amine having 5 to 8 atoms, a diamine, a triamine, a tetra-amine, a polymeric amine, a thiol, a disulfide, or —NH—$R_1$—SH; and $R_1$ is a hydrocarbyl.

According to an embodiment, a corrosion inhibitor includes a polymer of formula R—O—(POL)-Z. R is a straight or branched alkyl or aryl; POL is a polyglycerol based polymer; Z is a non-ionic amine, a cyclic amine having 5 to 8 atoms, a diamine, a triamine, a tetra-amine, a polymeric amine, a thiol, a disulfide, or —NH—$R_1$—SH; and $R_1$ is a hydrocarbyl.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

DETAILED DESCRIPTION

Figure 1:
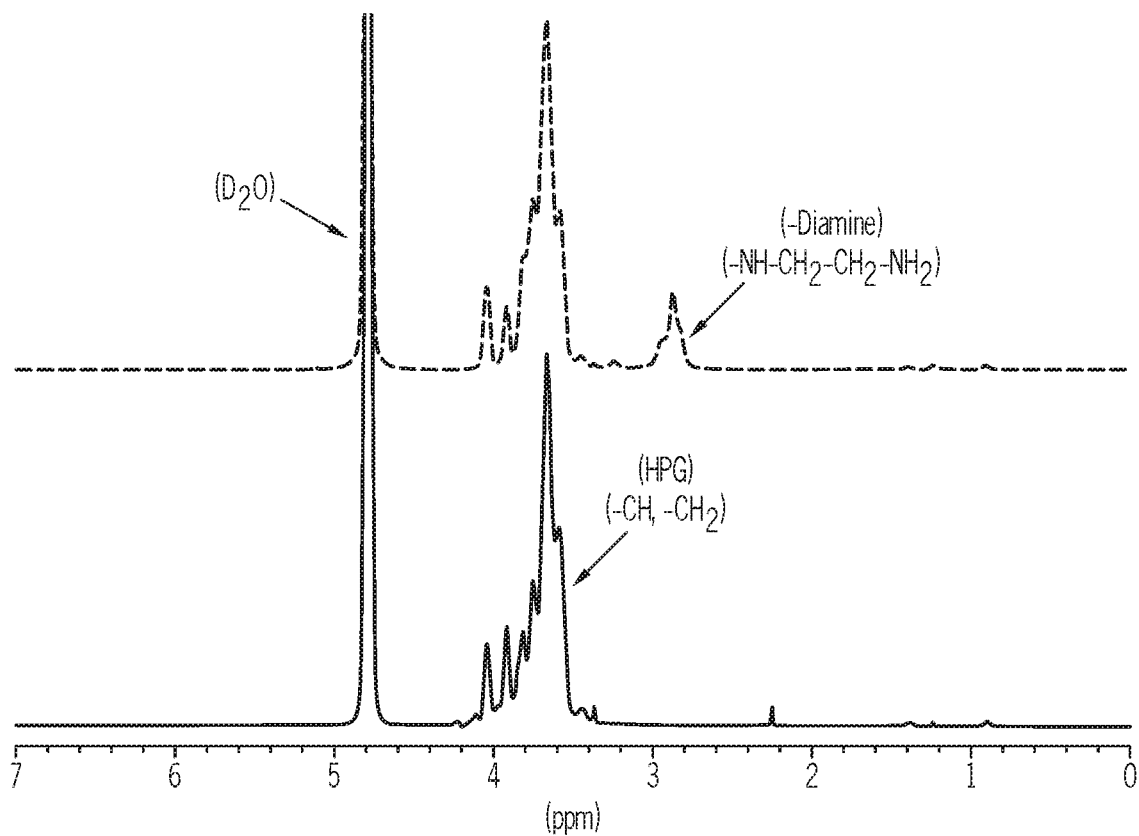
FIG. 1 is a set of nuclear magnetic resonance spectra related to an embodiment of the corrosion inhibitor described herein.

In one or more embodiments, a corrosion inhibitor includes a polymer of formula (1):

$$R\text{—}O\text{—}(POL)\text{-}Z \qquad (1)$$

where R is a straight or branched alkyl or aryl; POL is a polyglycerol based polymer; Z is a non-ionic amine, a cyclic amine having five to eight atoms, a diamine, a triamine, a tetra-amine, a polymeric amine, a thiol, a disulfide, or —NH—$R_1$—SH in which $R_1$ is a hydrocarbyl.

When used to describe certain carbon atom-containing chemical groups, a parenthetical expression having the form "$(C_x\text{-}C_y)$" means that the unsubstituted form of the chemical group has from x carbon atoms to y carbon atoms, inclusive of x and y. For example, a $(C_1\text{-}C_{20})$ alkyl is an alkyl group having from 1 to 20 carbon atoms in its unsubstituted form. In some embodiments and general structures, certain chemical groups may be substituted by one or more substituents such as $R^S$. An $R^S$ substituted version of a chemical group defined using the "$(C_x\text{-}C_y)$" parenthetical may contain more than y carbon atoms depending on the identity of any groups $R^S$. For example, a "$(C_1\text{-}C_{20})$ alkyl substituted with exactly one group $R^S$, where $R^S$ is phenyl (—$C_6H_5$)" may contain from 7 to 26 carbon atoms. Thus, in general when a chemical group defined using the "$(C_x\text{-}C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (—H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless otherwise clearly specified mean the same thing.

In embodiments, R of formula (1) is a straight or branched alkyl or aryl. For instance, R may be a straight or branched ($C_1$-$C_{20}$) alkyl or aryl. The term "alkyl," means a saturated straight or branched chain, substituted or unsubstituted hydrocarbon radical having from 1 to 20 carbon atoms. The term "($C_1$-$C_{20}$) alkyl" means an alkyl having from 1 to 20 carbon atoms that is unsubstituted or substituted. In one or more embodiments, the R group is an unsubstituted alkyl. Examples of unsubstituted ($C_1$-$C_{20}$) alkyl are unsubstituted ($C_1$-$C_{20}$) alkyl; unsubstituted ($C_1$-$C_{10}$) alkyl; unsubstituted ($C_1$-$C_5$) alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. In one or more embodiments, the R group of formula (1) is a substituted alkyl. Examples of substituted ($C_1$-$C_{20}$) alkyl are substituted ($C_1$-$C_{20}$) alkyl and substituted ($C_1$-$C_{10}$) alkyl. In various embodiments, the R group comprises 2 to 12 carbon atoms, 2 to 6 carbon atoms, 3 to 5 carbon atoms, or 4 carbon atoms. In one or more embodiments, the R group may be $C_2H_n$ (where n=2, 3, or 4), $C_4H_n$ (where n=7, 8, or 9), $C_6H_n$ (where n=11, 12, or 13), or $C_{10}H_n$ (where n=19, 20, or 21).

In embodiments, POL of formula (1) is a polyglycerol based polymer. In embodiments, POL may be a dendritic polyglycerol homopolymer, a branched polyglycerol homopolymer, a hyperbranched polyglycerol homopolymer, a functionalized polyglycerol, a dendritic copolymer comprising polyglycerol, a branched copolymer comprising polyglycerol, a hyperbranched copolymer comprising polyglycerol, a dendritic terpolymer comprising polyglycerol, a branched terpolymer comprising polyglycerol, a hyperbranched terpolymer comprising polyglycerol, a derivative of a hyperbranched polyglycerol, or a combination of two or more thereof. As used herein, the term "derivative" refers to chemical modification of molecules, either synthetic organic molecules or proteins, nucleic acids, or any class of small molecules such as fatty acids, or other small molecules that are prepared either synthetically or isolated from a natural source, such as a plant, that retain at least one function of the active parent molecule, but may be structurally different. Chemical modifications may include, for example, replacement of hydrogen by an alkyl, acyl, or amino group. As used herein, the term "functionalized polyglycerol" refers to a polyglycerol having additional groups, such as alkyl groups, which are directly attached to polyglycerol. In dendritic embodiments, the dendritic polyglycerol may include from 1 generation to 10 generations, from 2 generations to 9 generations, from 3 generations to 8 generations, from 4 generations to 7 generations, or even from 5 generations to 6 generations. As used herein, the term "generation" refers to a repeated branching cycle performed during synthesis of the dendritic polymer. It should be understood that the range of the number of generations may be from any of the lower bounds for the number of generations to any of the upper bounds for the number of generations described herein.

Due to the nature of POL of formula (1) as a branched, hyperbranched, or dendritic polymer, the polymer of the corrosion inhibitor may possess a plurality of terminal groups to which Z of formula (1) may be bound. In embodiments, POL of formula (1) may terminate with an oxygen radical. This oxygen radical may then form a bond with a hydrogen radical such that the POL may be said to be "hydroxyl terminated." The oxygen radical may, alternatively, form a bond with Z of formula (1). In embodiments, all available oxygen radicals may form a bond with Z of formula (1), such that the polymer of the corrosion inhibitor may be said to be "totally modified." In other embodiments, less than all available oxygen radicals may form a bond with Z of formula (1), such that the polymer of the corrosion inhibitor may be said to be "partially modified."

In embodiments, Z of formula (1) is a non-ionic amine, a cyclic amine having five to eight atoms, a diamine, a triamine, a tetra-amine, a polymeric amine, a thiol, a disulfide, or —NH—$R_1$—SH in which $R_1$ is a hydrocarbyl. Without intending to be bound by any particular theory, it is believed that the polymer of the corrosion inhibitor may form a corrosion inhibition film barrier on metallic surfaces. Z of formula (1) provides a means to interact with the metallic surface, which increases adherence of the film to the metallic surface relative to corrosion inhibitors without Z of formula (1) through physisorption and/or chemisorption interactions with the metal surface, taking advantage of van der Waals forces, dipole interactions, electron transfer interactions, or electrostatic interactions.

Exemplary Z include, but are not limited to, histamine, tryptamine, serotonin, ethylenediamine, putrescine, spermidine, polyethylenimine, ethanolamine, allylamine, furfurylamine, propargylamine, N-(3-aminopropyl) morpholine, adenine, 3-amino-1,2,4-triazole, 5-amino-1,2,4-thiadiazole, 4-(propan-2-yl)-1,3-thiazol-2-amine, 2-amino-3-mercapto-3-methylbutanoic acid, methionine, cysteine, cysteamine, 5-amino-1,3,4-thiadiazole-2-thiol, 2-amino-1,3,4-thiadiazole, 2-aminobenzimidazole, 2-aminoimidazoline, 2-thiphenemethylamine, 2-thiophenamine, 2-thiopheneethylamine, and 3-thiophenamine. Chemical formulae for the above compounds are provided in Table 1. For each of these structures, Z binds POL at the primary amine site. If multiple primary amine sites are present in Z, it is believed that only one primary amine of Z will bind to POL, leaving a free primary amine in POL-Z. For polyethylenimine, it is believed that Z binds POL at a primary amine end group site.

TABLE 1

Exemplary Z

| Name | Structure |
|---|---|
| Histamine | [structure: imidazole ring connected to -CH2-CH2-NH2] |

TABLE 1-continued
Exemplary Z
| Name | Structure |
|---|---|
| Tryptamine | 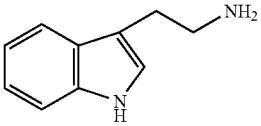 [SMILES: NCCc1c[nH]c2ccccc12] |
| Serotonin | 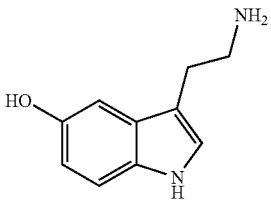 [SMILES: NCCc1c[nH]c2ccc(O)cc12] |
| Ethylenediamine | 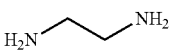 |
| Putrescine | 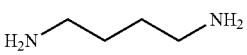 |
| Spermidine | 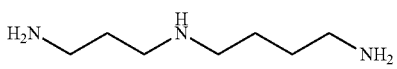 |
| Polyethylenimine | 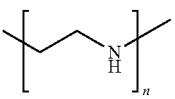 |
| Ethanolamine | 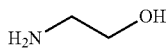 |
| Allylamine | 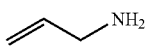 |
| Furfurylamine | 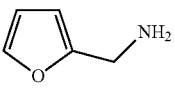 |
| Propargylamine | 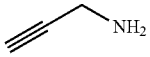 |
| N-(3-Aminopropyl) morpholine | 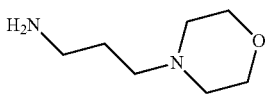 |
| Adenine | 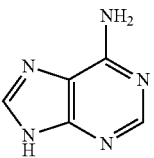 |
| 3-Amino-1,2,4-triazole | 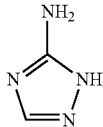 |
| 5-Amino-1,2,4-thiadiazole | 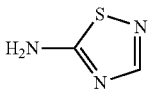 |

TABLE 1-continued

| Exemplary Z | |
|---|---|
| Name | Structure |
| 4-(Propan-2-yl)-1,3-thiazol-2-amine | *(structure)* |
| 2-Amino-3-mercapto-3-methylbutanoic acid | *(structure)* |
| Methionine | *(structure)* |
| Cysteine | *(structure)* |
| Cysteamine | *(structure)* |
| 5-Amino-1,3,4-thiadiazole-2-thiol | *(structure)* |
| 2-Amino-1,3,4-thiadiazole | *(structure)* |
| 2-Aminobenzimidazole | *(structure)* |

TABLE 1-continued

Exemplary Z

| Name | Structure |
|---|---|
| 2-Aminoimidazoline | (2-aminoimidazoline structure) |
| 2-Thiophenemethyl-amine | (2-thiophenemethylamine structure) |
| 2-Thiophenamine | (2-thiophenamine structure) |
| 2-Thiopheneethyl-amine | (2-thiopheneethylamine structure) |
| 3-Thiophenamine | (3-thiophenamine structure) |

In embodiments, $R_1$, when present, is a ($C_1$-$C_{20}$) hydrocarbyl. For instance, $R_1$ may be a $C_1$ hydrocarbyl, a $C_2$ hydrocarbyl, a $C_3$ hydrocarbyl, a $C_4$ hydrocarbyl, a $C_5$ hydrocarbyl, a $C_6$ hydrocarbyl, a $C_7$ hydrocarbyl, a $C_8$ hydrocarbyl, a $C_9$ hydrocarbyl, a $C_{10}$ hydrocarbyl, a $C_{11}$ hydrocarbyl, a $C_{12}$ hydrocarbyl, a $C_{13}$ hydrocarbyl, a $C_{14}$ hydrocarbyl, a $C_{15}$ hydrocarbyl, a $C_{16}$ hydrocarbyl, a $C_{17}$ hydrocarbyl, a $C_{18}$ hydrocarbyl, a $C_{19}$ hydrocarbyl, or a $C_{20}$ hydrocarbyl. In embodiments, $R_1$ is —$CH_2$—$CH_2$—.

In embodiments, Z of formula (1) is a diamine of formula —NH—$R_2$—$NH_2$, where $R_2$ is a ($C_1$-$C_{20}$) hydrocarbyl. For instance, $R_2$ may be a $C_1$ hydrocarbyl, a $C_2$ hydrocarbyl, a $C_3$ hydrocarbyl, a $C_4$ hydrocarbyl, a $C_5$ hydrocarbyl, a $C_6$ hydrocarbyl, a $C_7$ hydrocarbyl, a $C_8$ hydrocarbyl, a $C_9$ hydrocarbyl, a $C_{10}$ hydrocarbyl, a $C_{11}$ hydrocarbyl, a $C_{12}$ hydrocarbyl, a $C_{13}$ hydrocarbyl, a $C_{14}$ hydrocarbyl, a $C_{15}$ hydrocarbyl, a $C_{16}$ hydrocarbyl, a $C_{17}$ hydrocarbyl, a $C_{18}$ hydrocarbyl, a $C_{19}$ hydrocarbyl, or a $C_{20}$ hydrocarbyl. In embodiments, $R_2$ is —$CH_2$—$CH_2$—.

In embodiments, Z of formula (1) is a polyethyleneimine. In embodiments in which Z is a polyethyleneimine, the polyethyleneimine may have a number average molecular weight of from 500 Daltons to 700 Daltons. For example, the polyethyleneimine may have a number average molecular weight of from 510 Daltons to 690 Daltons, from 520 Daltons to 680 Daltons, from 530 Daltons to 670 Daltons, from 540 Daltons to 660 Daltons, from 550 Daltons to 650 Daltons, from 560 Daltons to 640 Daltons, from 570 Daltons to 630 Daltons, from 580 Daltons to 620 Daltons, or even from 590 Daltons to 610 Daltons. It should be understood that the range of the molecular weight may be from any of the lower bounds for the molecular weight to any of the upper bounds for the molecular weight described herein.

In embodiments, the polymer of the corrosion inhibitor may have a weight average molecular weight (Mw) of from 5000 Daltons to 100,000 Daltons, from 10,000 Daltons to 95,000 Daltons, from 15,000 Daltons to 90,000 Daltons, from 20,000 Daltons to 85,000 Daltons, from 25,000 Daltons to 80,000 Daltons, from 30,000 Daltons to 75,000 Daltons, from 35,000 Daltons to 70,000 Daltons, from 40,000 Daltons to 65,000 Daltons, from 45,000 Daltons to 60,000 Daltons, or even from 50,000 Daltons to 55,000 Daltons. It should be understood that the range of Mw may be from any of the lower bounds for Mw to any of the upper bounds for Mw described herein.

Exemplary polymers of the corrosion inhibitor may be represented by formula (2). Partial modification includes embodiments in which from 1 to N−1 oxygen radical terminal groups form a bond with Z of formula (1), where N is the total number of all oxygen radical terminal groups in POL of formula (1). For instance, embodiments of partially modified polymers may have from 0.01% to 99.999% of all oxygen radical terminal groups bonded to Z of formula 1. In formula (2), 12 oxygen radical terminal groups are bonded to Z, while 21 oxygen radical terminal groups are bonded to a hydrogen radical, providing N=33. Thus, the embodiment provided by formula (2) has about 36% of all oxygen radical terminal groups bonded to Z of formula (1). It should be understood that formula (2) is merely exemplary of the subject matter described herein and is in no way intended to be limiting.

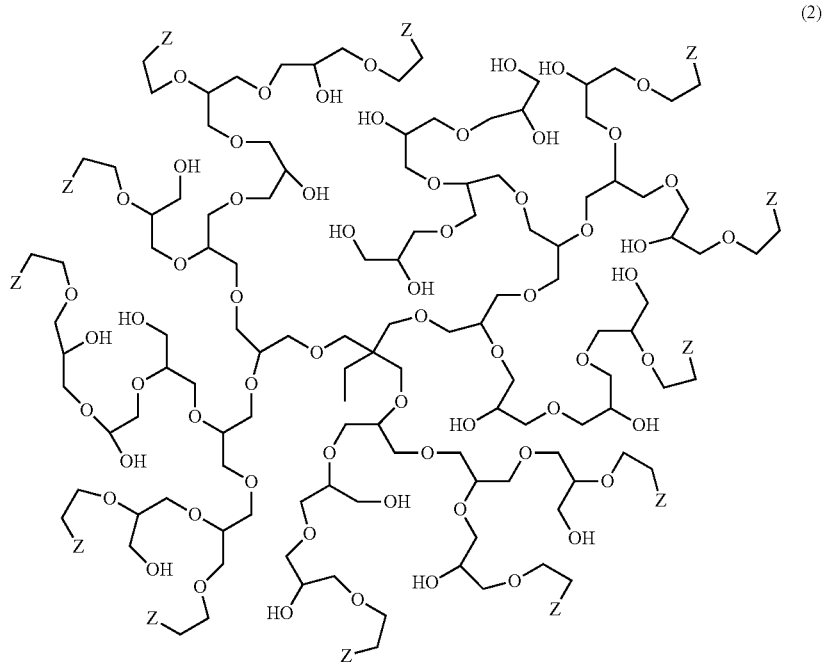

(2)

In another aspect, a process for preventing corrosion of a metallic surface of a pipeline includes contacting the metallic surface with a corrosion inhibitor as described herein. In embodiments, the metallic surface may be contacted with a solution containing from 30 ppm to 70 ppm corrosion inhibitor. Such a solution may have, for example, from 31 ppm to 69 ppm, from 32 ppm to 68 ppm, from 33 ppm to 67 ppm, from 34 ppm to 66 ppm, from 35 ppm to 65 ppm, from 36 ppm to 64 ppm, from 37 ppm to 63 ppm, from 38 ppm to 62 ppm, from 39 ppm to 61 ppm, from 40 ppm to 60 ppm, from 41 ppm to 59 ppm, from 42 ppm to 58 ppm, from 43 ppm to 57 ppm, from 44 ppm to 56 ppm, from 45 ppm to 55 ppm, from 46 ppm to 54 ppm, from 47 ppm to 53 ppm, from 48 ppm to 52 ppm, or even from 49 ppm to 51 ppm. It should be understood that the range of the corrosion inhibitor concentration in the solution may be from any of the lower bounds for the concentration to any of the upper bounds for the concentration described herein.

In embodiments, the metallic surface may be contacted with the corrosion inhibitor at least one time, at least two times, at least three times, at least four times, or even at least five times. It should be understood that when the metallic surface is contacted with the corrosion inhibitor multiple times, each contacting may be accomplished using the same or different concentrations of the corrosion inhibitor described herein. For instance, if the metallic surface is contacted with the corrosion inhibitor solution two times, the solution may have, for example, from 45 ppm to 55 ppm corrosion inhibitor for the first and second time the metallic surface is contacted with the corrosion inhibitor. However, in alternative embodiments, the first contacting may use a solution having, for example, from 45 ppm to 55 ppm, and the second contacting may use a solution having some other concentration of corrosion inhibitor described herein.

Without intending to be bound by any particular theory, the hyperbranched polymers disclosed herein are believed to provide a corrosion inhibition film barrier due to their shape and accessible multiple sites of interaction with the metallic surface. Thus, the corrosion inhibitors described herein are believed to protect the metallic surface from corrosion. As a result, the efficiency of the corrosion inhibitor is increased relative to that of conventional corrosion inhibitors, and frequent injection of the corrosion inhibitor onto the metallic surface is not required.

According to an aspect, either alone or in combination with any other aspect, a process for preventing corrosion of a metallic surface of a pipeline includes contacting the metallic surface with a corrosion inhibitor. The corrosion inhibitor comprises a polymer of formula R—O—(POL)-Z. R is a straight or branched alkyl or aryl; POL is a polyglycerol based polymer; Z is a non-ionic amine, a cyclic amine having 5 to 8 atoms, a diamine, a triamine, a tetra-amine, a polymeric amine, a thiol, a disulfide, or —NH—$R_1$—SH; and $R_1$ is a hydrocarbyl.

According to a second aspect, either alone or in combination with any other aspect, R is a straight or branched ($C_1$-$C_{20}$) alkyl or aryl in the process.

According to a third aspect, either alone or in combination with any other aspect, POL is selected from a dendritic polyglycerol homopolymer, a branched polyglycerol homopolymer, a hyperbranched polyglycerol homopolymer, a dendritic copolymer comprising polyglycerol, a branched copolymer comprising polyglycerol, a hyperbranched copolymer comprising polyglycerol, a dendritic terpolymer comprising polyglycerol, a branched terpolymer comprising polyglycerol, a hyperbranched terpolymer comprising polyglycerol, a derivative of a hyperbranched polyglycerol, and a combination of two or more thereof in the process.

According to a fourth aspect, either alone or in combination with any other aspect, $R_1$ is a ($C_1$-$C_{20}$) hydrocarbyl in the process.

According to a fifth aspect, either alone or in combination with any other aspect, Z is a diamine having a structure —NH—$R_2$—$NH_2$, where $R_2$ is a ($C_1$-$C_{20}$) hydrocarbyl in the process.

According to a sixth aspect, either alone or in combination with any other aspect, $R_2$ is —$CH_2$—$CH_2$— in the process.

According to a seventh aspect, either alone or in combination with any other aspect, Z is —NH—$R_1$—SH in the process.

According to an eighth aspect, either alone or in combination with any other aspect, $R_1$ is —$CH_2$—$CH_2$— in the process.

According to a ninth aspect, either alone or in combination with any other aspect, POL is a dendritic polyglycerol of from 1 to 10 generations or a hyperbranched polyglycerol having a weight average molecular weight of from 5000 Daltons to 100,000 Daltons in the process.

According to a tenth aspect, either alone or in combination with any other aspect, the polymer of the corrosion inhibitor has a weight average molecular weight of from 5000 Daltons to 100,000 Daltons in the process.

According to an eleventh aspect, either alone or in combination with any other aspect, the contacting is in an environment having a pH of from 6 to 7 in the process.

According to a twelfth aspect, either alone or in combination with any other aspect, the contacting comprises applying a solution comprising from 30 ppm to 70 ppm corrosion inhibitor to the metallic surface at least one time in the process.

According to a thirteenth aspect, either alone or in combination with any other aspect, the solution comprises from 45 ppm to 55 ppm corrosion inhibitor, and the solution is applied to the metallic surface two times in the process.

According to a fourteenth aspect, either alone or in combination with any other aspect, a corrosion inhibitor includes a polymer of formula R—O—(POL)-Z. R is a straight or branched alkyl or aryl; POL is a polyglycerol based polymer; Z is a non-ionic amine, a cyclic amine having 5 to 8 atoms, a diamine, a triamine, a tetra-amine, a polymeric amine, a thiol, a disulfide, or NH—$R_1$—SH; and $R_1$ is a hydrocarbyl.

According to a fifteenth aspect, either alone or in combination with any other aspect, R is a straight or branched ($C_1$-$C_{20}$) alkyl or aryl in the corrosion inhibitor.

According to a sixteenth aspect, either alone or in combination with any other aspect, POL is selected from a dendritic polyglycerol homopolymer, a branched polyglycerol homopolymer, a hyperbranched polyglycerol homopolymers, a dendritic copolymer comprising polyglycerol, a branched copolymer comprising polyglycerol, a hyperbranched copolymer comprising polyglycerol, a dendritic terpolymer comprising polyglycerol, a branched terpolymer comprising polyglycerol, a hyperbranched terpolymer comprising polyglycerol, a derivative of a hyperbranched polyglycerol, and a combination of two or more thereof in the corrosion inhibitor.

According to a seventeenth aspect, either alone or in combination with any other aspect, $R_1$ is a ($C_1$-$C_{20}$) hydrocarbyl in the corrosion inhibitor.

According to an eighteenth aspect, either alone or in combination with any other aspect, Z is a diamine having a structure —NH—$R_2$—$NH_2$, where $R_2$ is a $C_1$-$C_{20}$ hydrocarbyl in the corrosion inhibitor.

According to a nineteenth aspect, either alone or in combination with any other aspect, $R_2$ is —$CH_2$—$CH_2$— in the corrosion inhibitor.

According to a twentieth aspect, either alone or in combination with any other aspect, Z is —NH—$R_1$—SH in the corrosion inhibitor.

According to a twenty-first aspect, either alone or in combination with any other aspect, $R_1$ is —$CH_2$—$CH_2$— in the corrosion inhibitor.

According to a twenty-second aspect, either alone or in combination with any other aspect, POL is a dendritic polyglycerol of from 1 to 10 generations or a hyperbranched polyglycerol having a weight average molecular weight of from 5000 Daltons to 100,000 Daltons in the corrosion inhibitor.

According to a twenty-third aspect, either alone or in combination with any other aspect, the polymer of the corrosion inhibitor has a weight average molecular weight of from 5000 Daltons to 100,000 Daltons.

According to a twenty-fourth aspect, either alone or in combination with any other aspect, POL is selected from the group consisting of a branched polyglycerol, a hyperbranched polyglycerol, a functionalized polyglycerol, and a combination of two or more thereof in the corrosion inhibitor.

According to a twenty-fifth aspect, either alone or in combination with any other aspect, Z is a polyethylenimine in the corrosion inhibitor.

According to a twenty-fifth aspect, either alone or in combination with any other aspect, the polyethylenimine has a number average molecular weight of from 500 Daltons to 700 Daltons in the corrosion inhibitor.

Examples

Using embodiments described above, exemplary corrosion inhibitors were prepared as according to the following examples.

Preparation of CH$_3$CH$_2$CCH$_2$—HPG-Cysteamine:

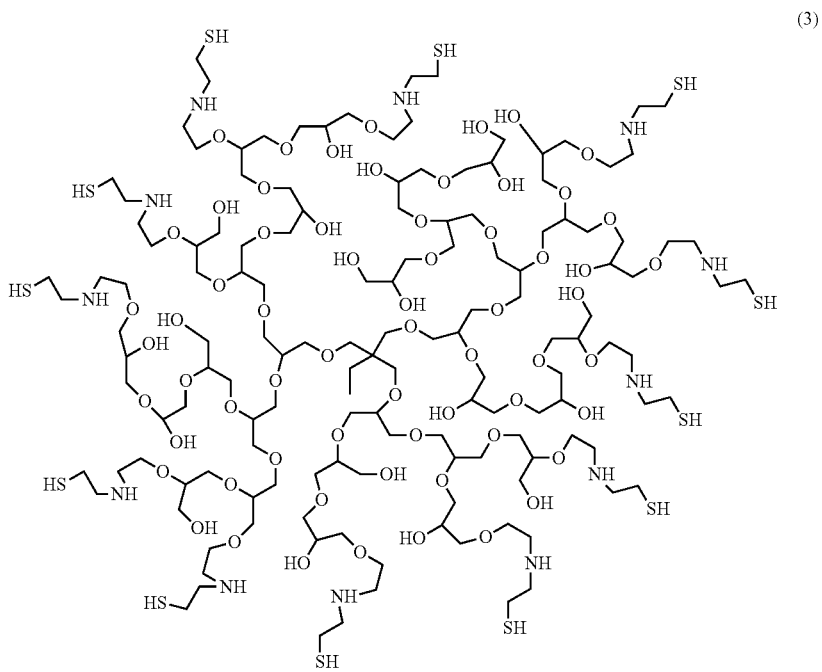 [SMILES: CCC(COCC(COCC(COCC(COCC(O)CO)OCC(O)COCC(O)CO)OCC(COCC(O)COCCNCCS)OCC(O)COCCNCCS)OCC(O)COCC(O)COCC(CO)OCCNCCS)(COCC(COCC(COCC(O)COCC(COCC(O)COCCNCCS)OCCNCCS)OCC(CO)OCCNCCS)OCC(COCC(COCCNCCS)OCC(CO)OCCNCCS)OCC(CO)OCC(O)OCC(O)COCCNCCS)COC(COCC(COCC(CO)OCCNCCS)OCC(O)COCCNCCS)COC(CO)COCC(O)COCCNCCS]

(3)

The synthesis of the polymer was carried out in a three-neck round bottom flask fitted with a mechanical stirrer through one pot synthesis. Trimethylolpropane (TMP) initiator (0.124 g; 0.92 mmol) was added to the flask under N$_2$ atmosphere, followed by 0.67 µl of potassium methylate solution in methanol (20 wt. %). The excess methanol was removed under vacuum. Anhydrous tetrahydropyran (2.0 ml) was added. The flask was held in an oil bath at 90° C., and 3 mL of glycidol (0.044 mol) was added dropwise over a period of 6 hours using a syringe pump at a flow rate of 0.008 ml/min. The final gel-like polymer was dissolved in methanol and precipitated with excess (5×) acetone. The polymer (hyperbranched polyglycerol; HPG) was dried in oven at 60° C. for 5 hours.

HPG (300 mg; 0.015 mmol) was dissolved in 5 ml of deionized water. After 20 min, NaIO$_4$ (0.375 mmol) was slowly added and the solution was stirred for 5 hours at room temperature (~25° C.). The solution was then dialyzed (1000 MW cut off) to remove unreacted NaIO$_4$ against water for 24 hours with frequent changing of the water. After completing the dialysis, an excess of cysteamine (0.57 g; 7.5 mmol) was added, and the solution was stirred for 5 hours. Finally, reduction was carried out by adding NaCNBH$_3$ (0.47 g; 7.5 mmole), and the solution was stirred overnight. The final solution was dialyzed (1000 MW cut off) to remove unreacted reagents and freeze-dried to get the final solid product (CH$_3$CH$_2$CCH$_2$—HPG-cysteamine; HBCI-1).

Preparation of CH₃CH₂CCH₂—POL-Ethylenediamine:

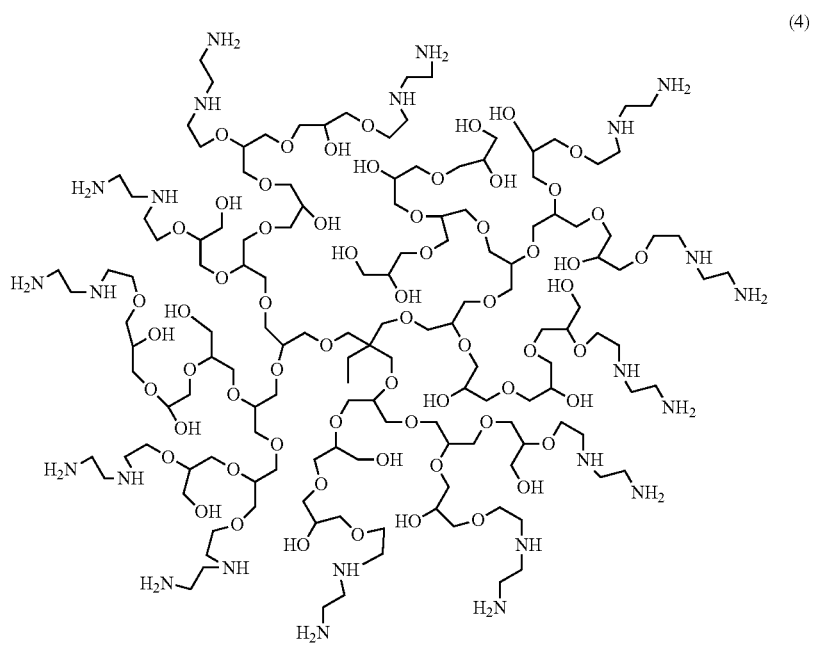 [SMILES: CCC(COCC(COCC(COCC(COCC(O)CO)OCC(O)COCC(O)CO)OCC(COCC(O)COCCNCCN)OCC(O)COCCNCCN)OCC(O)COCC(O)COCC(CO)OCCNCCN)(COCC(COCC(COCC(O)COCC(COCC(O)COCCNCCN)OCCNCCN)OCC(CO)OCCNCCN)OCC(COCC(COCCNCCN)OCC(CO)OCCNCCN)OCC(CO)OCC(O)OCC(O)COCCNCCN)COC(COCC(COCC(CO)OCCNCCN)OCC(O)COCCNCCN)COC(CO)COCC(O)COCCNCCN]

(4)

The synthesis of the polymer was carried out in a three-neck round bottom flask fitted with a mechanical stirrer through one pot synthesis. Trimethylolpropane (TMP) initiator (0.124 g; 0.92 mmol) was added to the flask under $N_2$ atmosphere, followed by 0.67 μl of potassium methylate solution in methanol (20 wt. %). The excess methanol was removed under vacuum. Anhydrous tetrahydropyran (2.0 ml) was added. The flask was held in an oil bath at 90° C., and 3 mL of glycidol (0.044 mol) was added dropwise over a period of 6 hours using a syringe pump at a flow rate of 0.008 ml/min. The final gel-like polymer was dissolved in methanol and precipitated with excess (5×) acetone. The polymer (hyperbranched polyglycerol; HPG) was dried in oven at 60° C. for 5 hours.

HPG (300 mg; 0.015 mmol) was dissolved in 5 ml of deionized water. After 20 min, $NaIO_4$ (0.375 mmol) was slowly added and the solution was stirred for 5 hours at room temperature (~25° C.). The solution was then dialyzed (1000 MW cut off) to remove unreacted $NaIO_4$ against water for 24 hours with frequent changing of the water. After completing the dialysis, an excess of ethylenediamine (1.12 g; 18 mmol) was added, and the solution was stirred for 5 hours. Finally, reduction was carried out by adding $NaCNBH_3$ (1.1 g; 7.5 mmole), and the solution was stirred overnight. The final solution was dialyzed (1000 MW cut off) to remove unreacted reagents and freeze-dried to get the final solid product ($CH_3CH_2CCH_2$—HPG-ethylenediamine; HBCI-2).

Preparation of CH$_3$CH$_2$CCH$_2$—POL-Polyethylenimine:

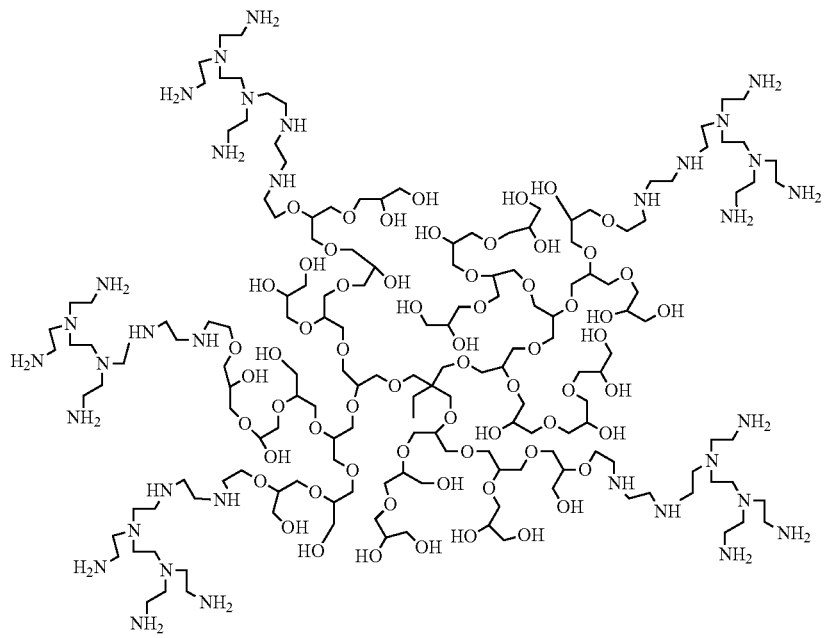 [SMILES: CCC(COCC(COCC(COCC(COCC(O)CO)OCC(O)COCC(O)CO)OCC(COCC(O)CO)OCC(O)COCCNCCNCCN(CCN)CCN(CCN)CCN)OCC(O)COCC(O)COCC(O)CO)(COCC(COCC(COCC(O)COCC(COCC(O)CO)OCCNCCNCCN(CCN)CCN(CCN)CCN)OCC(O)CO)OCC(COCC(CO)OCC(CO)OCCNCCNCCN(CCN)CCN(CCN)CCN)OCC(CO)OCC(O)OCC(O)COCCNCCNCCN(CCN)CCN(CCN)CCN)COC(COCC(COCC(CO)OCCNCCNCCN(CCN)CCN(CCN)CCN)OCC(O)CO)COC(CO)COCC(O)CO]

The synthesis of the polymer was carried out in a three-neck round bottom flask fitted with a mechanical stirrer through one pot synthesis. Trimethylolpropane (TMP) initiator (0.124 g; 0.92 mmol) was added to the flask under N$_2$ atmosphere, followed by 0.67 μl of potassium methylate solution in methanol (20 wt. %). The excess methanol was removed under vacuum. Anhydrous tetrahydropyran (2.0 ml) was added. The flask was held in an oil bath at 90° C., and 3 mL of glycidol (0.044 mol) was added dropwise over a period of 6 hours using a syringe pump at a flow rate of 0.008 ml/min. The final gel-like polymer was dissolved in methanol and precipitated with excess (5x) acetone. The polymer (hyperbranched polyglycerol; HPG) was dried in oven at 60° C. for 5 hours.

HPG (300 mg; 0.015 mmol) was dissolved in 5 ml of deionized water. After 20 min, NaIO$_4$ (0.375 mmol) was slowly added and the solution was stirred for 5 hours at room temperature (~25° C.). The solution was then dialyzed (500 MW to 1000 MW cut off) to remove unreacted NaIO$_4$ against water for 24 hours with frequent changing of the water. After completing the dialysis, an excess of polyethylenimine (M$_n$=600 Daltons; 1.12 g; 1.87 mmol) was added, and the solution was stirred for 5 hours. Finally, reduction was carried out by adding NaCNBH$_3$ (0.12 g; 1.87 mmole), and the solution was stirred overnight. The final solution was dialyzed (1000 MW cut off) to remove unreacted reagents and freeze-dried to get the final solid product (CH$_3$CH$_2$CCH$_2$—HPG-polyethylenimine).

Figure 2:
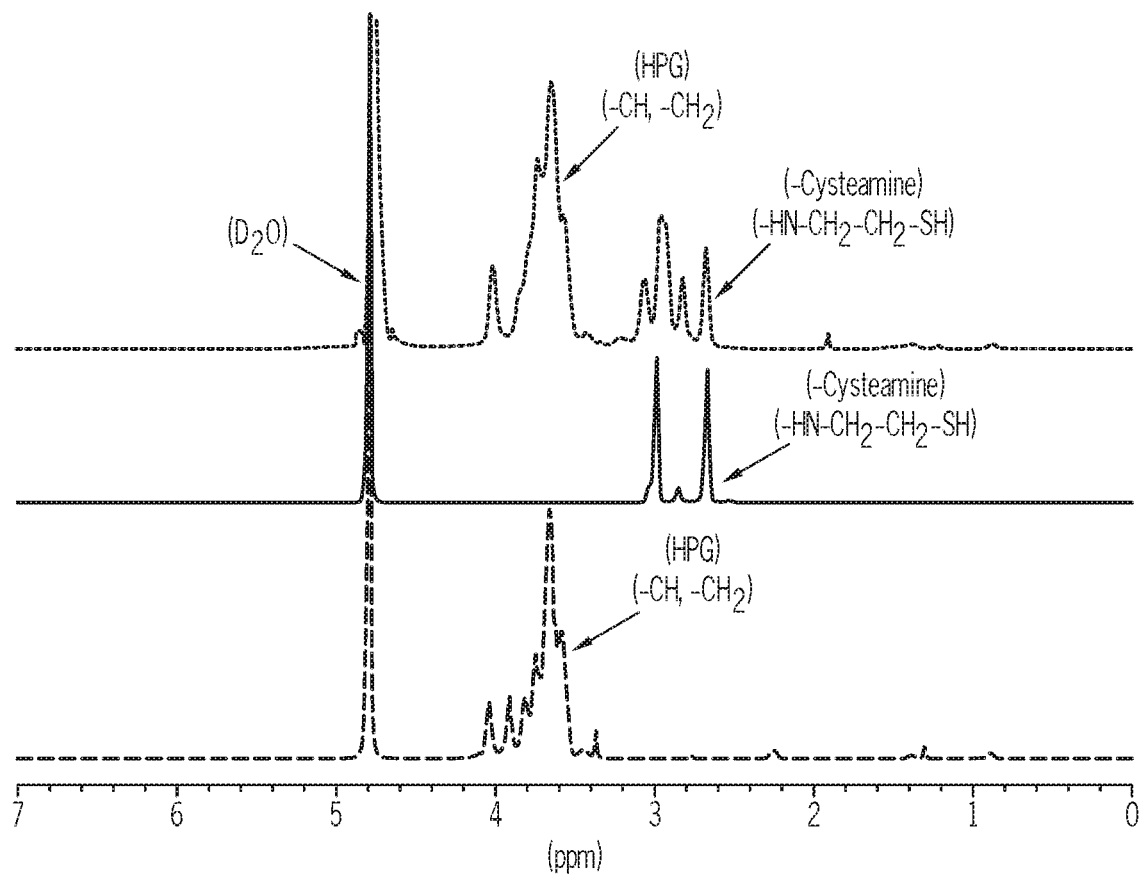
FIG. 2 is a set of nuclear magnetic resonance spectra related to another embodiment of the corrosion inhibitor described herein.

Characterization with $^1$H-NMR, $^{13}$C-NMR, and IR:

HPG, HBCI-1 and HBCI-2 were characterized using $^1$H and $^{13}$C nuclear magnetic resonance (NMR) spectroscopy. Nuclear magnetic resonance (NMR) spectroscopy is a powerful method for structure elucidation of polymers in terms of percentage of monomers incorporation in the final polymer. A Varian 500 MHz VNMRS and a JEOL 500 MHz NMR were utilized to obtain spectra using appropriate acquisition parameters. The $^1$H and $^{13}$C NMR analyses were carried out for HBCI-1 and HBCI-2 using deuterated solvents (CDCl$_3$, D$_2$O, and DMSO-d$_6$) and chemical shifts were set to those of deuterated trimethylsilylpropanoic acid (0 ppm). As shown in FIG. 1 (HBCI-2) and FIG. 2 (HBCI-1), the $^1$H-NMR analysis of all samples exhibited peaks due to HPG groups (3.2 ppm-4 ppm); diamine peaks were present (2.8 ppm-2.9 ppm) in the spectrum of HBCI-2; and cysteamine peaks were present (2.58 ppm-3.0 ppm) in the spectrum of HBCI-1.

Similarly, $^{13}$C-NMR analysis of both samples has distinct peaks for functionalized groups. The $^{13}$C-NMR spectrum of HBCI-2 exhibited a peak at 40 ppm for the carbon directly attached to the primary amine (—NH—CH$_2$—CH$_2$—NH$_2$) and at 49 ppm for the carbon directly attached to the secondary amine (—NH—CH$_2$—CH$_2$—NH$_2$). The peaks due to the HPG backbone are present at 68-73 ppm (—CH, —CH$_2$ groups).

The $^{13}$C-NMR spectrum of HBCI-1 also exhibited specific peaks for the functionalized groups. The spectrum includes a peak at 25 ppm for the carbon directly attached to thiol group of cysteamine (—NH—CH$_2$—CH$_2$—SH) and at 48 ppm for the carbon directly attached to the secondary amine (—NH—CH$_2$—CH$_2$—SH). The peaks due to the HPG backbone are present at 68-73 ppm (—CH, —CH$_2$ groups).

A Thermo Scientific FTIR spectrometer (NICOLET™ 6700, Thermo Electron Corporation, Madison, Wis., USA) was used to record IR spectra. HBCI-2 exhibits O—H and N—H stretching peaks at 3200 cm$^{-1}$-3500 cm$^{-1}$ and C—H stretching peak at 2870 cm$^{-1}$. The N—H bending peak of primary and secondary amine were present at 1650 cm$^{-1}$ and 1580 cm$^{-1}$, respectively. HBCI-1 exhibits O—H and N—H stretching peaks at 3200 cm$^{-1}$-3500 cm$^{-1}$ and C—H stretching peak and S—H peak at 2560 cm$^{-1}$-2650 cm$^{-1}$. The N—H bending peak of secondary amine was present at 1580 cm$^{-1}$.

Performance Evaluation of HPG-Diamine (HBCI-1) and HPG-SH (HBCI-2):

Corrosion inhibition was determined by linear polarization resistance (LPR). In LPR, a very small voltage of less than 20 millivolts (mV) is applied above and below the metal's corrosion potential in a three-electrode cell. Over this narrow range of applied voltages, the current flow between the polarized electrodes is measured. The ratio of voltage to current is the linear polarization resistance, which is inversely proportional to the corrosion current where the corrosion rate can be calculated.

In the present example, LPR measurements were conducted in 3.5% sodium chloride (NaCl) solution at 60° C. using ASTM method G59-97 for LPR tests. $CO_2$ gas was used to continuously purge the corrosion cell during the exposure time at a constant rate (25 ml/min), and the tested material was carbon steel C-1018. The experimental set up used a corrosion cell connected to a potentiostat, such as the PARSTAT 4000 available from Ametek Scientific Instruments. The LPR measurements were carried out using a glass setup with the volume capacity of 0.85 l. A 9 cm×9 cm exposed surface area of the carbon steel coupon was used to measure the corrosion for 24 hours. The applied potential of LPR versus open circuit potential was 10 mV.

The corrosion inhibition efficiency (IE %) of each inhibitor was calculated using equation (1):

$$IE\% = \frac{(CR_{blank} - CR_{inhib})}{CR_{blank}} \times 100\%, \tag{1}$$

where $CR_{blank}$ is the corrosion rate without inhibitor and $CR_{inhib}$ is the corrosion rate with the inhibitor.

Each of four conventionally used corrosion inhibitors were used in four LPR experiments (CCI-1, CCI-2, CCI-3, and CCI-4). Conventional corrosion inhibitors are typically based on fatty acid imidazoline, imidazoline salts, fatty acid tall oil polymers, imidazoline acetate, quaternary ammonium compounds, and alkyl pyridinium benzyl quaternary ammonium compounds as active film-forming components in the corrosion inhibitors. Two corrosion inhibitors containing the polymers of formulae (3) and (4) were used in an additional two LPR experiments (HBCI-1 and HBCI-2, respectively). The corrosion inhibition efficiency of each corrosion inhibitor is provided in the chart shown in FIG. 3 and summarized in Table 2.

TABLE 2

Corrosion inhibition efficiency of corrosion inhibitors

| Corrosion Inhibitor | Corrosion Inhibition Efficiency (%) |
|---|---|
| CCI-1 | 80.10 |
| CCI-2 | 73.17 |
| CCI-3 | 68.85 |
| CCI-4 | 40.41 |
| HBCI-1 | 90.04 |
| HBCI-2 | 54.51 |

Figure 3:
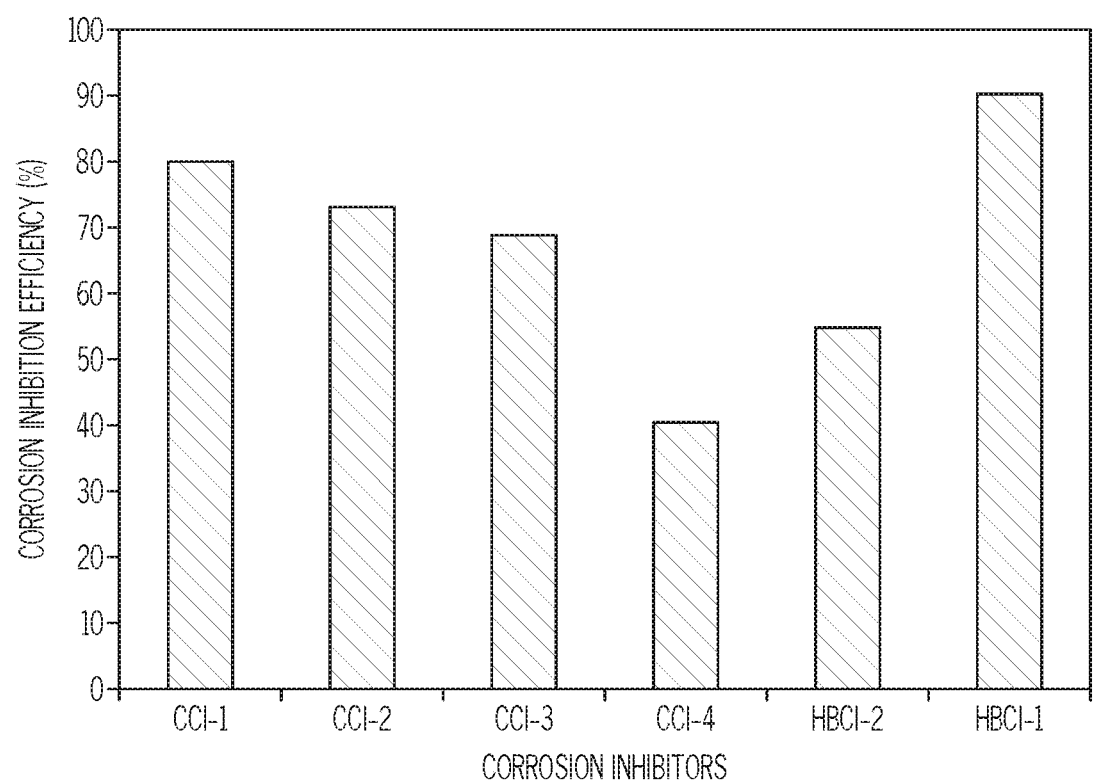
FIG. 3 is a chart depicting corrosion inhibition efficiency attained in accordance embodiments of the corrosion inhibition process described herein.

The corrosion inhibition results shown in the FIG. 3 indicate that HBCI-1 has a better corrosion inhibitor efficiency (and thus a better anti-corrosion activity) than all of the conventional commercial corrosion inhibitors used in oil and gas industry examined in these experiments. Further, the corrosion inhibitor HBCI-2 showed lower corrosion inhibition efficiency than three of the conventional commercial corrosion inhibitors, but HBCI-2 still has higher corrosion inhibition efficiency than one conventional commercial corrosion inhibitor, CCI-4.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that that the mere use of the term "first" and "second" does not require that there be any "third" component, although that possibility is contemplated under the scope of the present disclosure.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

What is claimed is:

1. A process for preventing corrosion of a metallic surface of a pipeline, the method comprising:
   contacting the metallic surface with a corrosion inhibitor, wherein the corrosion inhibitor comprises a polymer of formula (1):

R—O—(POL)-Z  (1)

where
   R is a straight or branched alkyl or aryl;
   POL is a polyglycerol based polymer;
   Z is a non-ionic amine, a cyclic amine having 5 to 8 atoms, a diamine, a triamine, a tetra-amine, a polymeric amine, a thiol, a disulfide, or —NH—$R_1$—SH; and
   $R_1$ is a hydrocarbyl.

2. The process of claim 1, wherein R is a straight or branched ($C_1$-$C_{20}$) alkyl or aryl.

3. The process of claim 1, wherein POL is selected from a dendritic polyglycerol homopolymer, a branched polyglycerol homopolymer, a hyperbranched polyglycerol homopolymer, a dendritic copolymer comprising polyglycerol, a branched copolymer comprising polyglycerol, a hyperbranched copolymer comprising polyglycerol, a dendritic terpolymer comprising polyglycerol, a branched terpolymer comprising polyglycerol, a hyperbranched terpolymer comprising polyglycerol, a derivative of a hyperbranched polyglycerol, and a combination of two or more thereof.

4. The process of claim 1, wherein Z is a diamine having a structure —NH—$R_2$—$NH_2$, where $R_2$ is a ($C_1$-$C_{20}$) hydrocarbyl.

5. The process of claim 4, wherein $R_2$ is —$CH_2$—$CH_2$—.

6. The process of claim 1, wherein Z is —NH—$R_1$—SH.

7. The process of claim 6, wherein $R_1$ is —$CH_2$—$CH_2$—.

8. The process of claim 6, wherein $R_1$ is a ($C_1$-$C_{20}$) hydrocarbyl.

9. The process of claim 1, wherein POL is a dendritic polyglycerol of from 1 to 10 generations or a hyperbranched polyglycerol having a weight average molecular weight of from 5000 Daltons to 100,000 Daltons.

10. The process of claim 1, wherein the polymer of the corrosion inhibitor has a weight average molecular weight of from 5000 Daltons to 100,000 Daltons.

11. The process of claim 1, wherein the contacting is in an environment having a pH of from 6 to 7.

12. The process of claim 1, wherein the contacting comprises applying a solution comprising from 30 ppm to 70 ppm corrosion inhibitor to the metallic surface at least one time.

13. The process of claim 12, wherein the solution comprises from 45 ppm to 55 ppm corrosion inhibitor, and the solution is applied to the metallic surface two times.

\* \* \* \* \*